G. BROOKS, E. I. DODDS & A. KITZINGER.
APPARATUS FOR MAKING BARS.
APPLICATION FILED MAY 26, 1915.
1,162,023.
Patented Nov. 30, 1915.
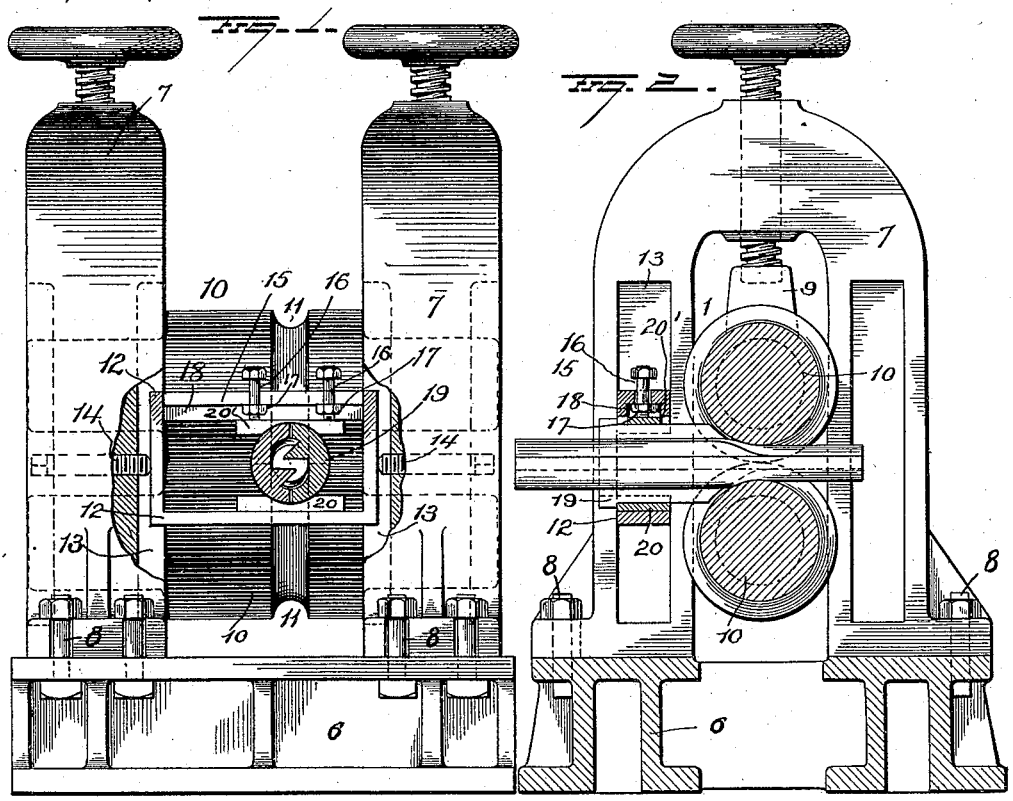
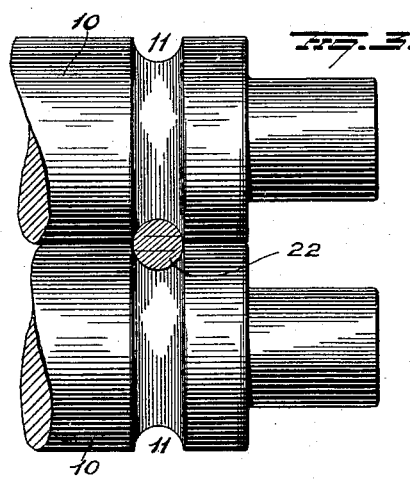
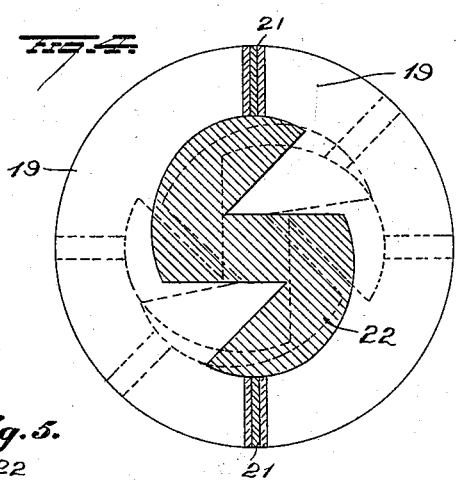

UNITED STATES PATENT OFFICE.

GEORGE BROOKS AND ETHAN I. DODDS, OF PITTSBURGH, AND ANDREW KITZINGER, OF HAYS, PENNSYLVANIA, ASSIGNORS TO FLANNERY BOLT COMPANY, OF PITTSBURGH, PENNSYLVANIA.

APPARATUS FOR MAKING BARS.

1,162,023.     Specification of Letters Patent.     Patented Nov. 30, 1915.

Application filed May 26, 1915. Serial No. 30,600.

*To all whom it may concern:*

Be it known that we, GEORGE BROOKS and ETHAN I. DODDS, of Pittsburgh, in the county of Allegheny, Pennsylvania, and ANDREW KITZINGER, of Hays, in the county of Allegheny and State of Pennsylvania, have invented certain new and useful Improvements in Apparatus for Making Bars; and we do hereby declare the following to be a full, clear, and exact description of the invention such as will enable others skilled in the art to which it appertains to make and use the same.

Our invention relates to an improvement in apparatus for making bars from which flexible track, boiler stay and other bolts are made.

In the manufacture of the bolts, a cylindrical bar of any desired length is passed between two or more rolls which groove it longitudinally at opposite sides thus transforming it from a round bar into an approximately N-shaped bar. The bar thus grooved and shaped is then passed between rolls, which again convert it into a round bar with oppositely disposed slots. In the final rolling it is essential that the bar be properly presented to the rolls and held against turning movement so that the slots will be uniformly closed, and the object of this invention is to provide means for holding and guiding the bar as it is fed to the rolls.

In the accompanying drawings, Figure 1 is a view in elevation of rolls showing our invention applied thereto; Fig. 2 is a view in transverse section of the same; Fig. 3 is a view in elevation of a portion of the rolls showing the bar therein; Fig. 4 is a view in end elevation of the guide and also showing in dotted lines, the parts in several rotary adjustments and Fig. 5 is a view in cross section of the bar prior to its final rolling.

6 represents the base block carrying the housings 7 which are secured to the block by the bolts 8, and which carry the bearings 9 in which the rolls 10 are journaled, each roll having a semi-cylindrical groove 11 as shown in Fig. 3. The housings 7 are recessed on their inner or adjacent faces to receive, support and guide the opposite ends of the guide box 12. This box is preferably rectangular in shape as shown, and is of a length sufficient to rest with its opposite ends within the recesses 13 in the housings 7, without contacting with the rear walls of the recesses, so as to permit of limited endwise adjustment. The width of the box 12 is approximately the width of the recesses so that the box is solidly supported at the front and rear by the walls of the recesses, and it is supported vertically and endwise by the screws 14 which pass through threaded holes in the housings 7, and bear at their inner ends against the box. Loosely passing through a slot 15 in the top member of the box 12 are the screws 16, carrying the nuts 17, which rest within the enlarged slot 18 formed in the lower face of the top member of the box, and which are prevented from turning when the screws are turned, by their contact with the side walls of said enlarged slot.

19 is the guide, cylindrical or approximately so, in cross section and tapering at its rear end so as to project well into the grooves 11 of the rolls 10. It is provided centrally with a bore which conforms in shape to the cross section of the slotted bar 22, which bore is of slightly greater cross sectional area than said bar so as to permit the latter to be readily drawn through the guide. This guide is made of two semi-cylindrical sections, and is supported in alinement with the grooves 11 in rolls 10 by the plates 20 and 20', the former of which rests on the lower member of the box and is provided on its upper surface with a concave seat to receive the guide, while the plate 20' is provided on its lower face with a concave seat resting on the guide and is held thereagainst by the screws 16 and nuts 17. A guide made of a solid integral member having a bore of the proper contour to accommodate the grooved bar, could be used if the grooved bars were always uniform as to size, but as they vary, due to unequal contraction in cooling, we have found it desirable to make the guide in two parts, so that variations in size may be compensated for by the insertion or removal of liners 21 (see Fig. 4) between the abutting edges of the two sections of the guide.

With this construction the box as a whole with the guide therein, may be adjusted vertically and endwise so as to bring the guide into proper alinement with the grooves in the rolls, and this guide may be turned to any position in bearings in plates 20, 20' to so present the bar to the rolls, that the grooves or slots in the bar will be uniformly closed without welding the walls thereof. If it be desired or necessary to slightly raise the guide, filler strips may be placed under the plate 20. The guide is solidly clamped in the box by the screws 16, nuts 17 and plate 20, the ends of the screws bearing on the plate and the nuts taking the upward thrust of the screws. By loosening up on these screws the guide will be released so that it may be turned or partly rotated and after proper adjustment has been secured, the guide may be again clamped by tightening the screws. The screws 14 at the side, simply hold the box in its vertical adjustments, all the longitudinal thrust against the guide being transmitted to the housings.

With the construction and arrangement shown, the guide holds and supports the bar solidly until the latter has been rolled into cylindrical shape, and after the bar has passed through the roll, it is cylindrical in form with two oppositely disposed closed slots as shown in Fig. 3. After the bar has been formed it is twisted, if desired, to carry the slots spirally around the bar, and is subsequently cut up into bolt blanks which are then headed and threaded in the usual manner.

Having fully described our invention what we claim as new and desire to secure by Letters-Patent, is:—

1. The combination of rolls, a guide for guiding a grooved bar to said rolls, the said guide having a bore approximating the size and shape of the cross section of said bar whereby the latter including the grooved portion will be supported by the guide, and means for supporting said guide in the plane of the rolls.

2. The combination of rolls mounted in housings, a guide box adjustably mounted in said housings, and a guide adjustably secured within said box the said guide having a bore conforming in shape to the cross section of the bar to be rolled.

3. A guide for guiding grooved bars to a pass between rolls, consisting of a box having an open center, and an approximately cylindrical guide adjustably secured within the open center of the box, the said guide having a bore conforming in cross section to the grooved bar to be rolled.

4. A guide for guiding a grooved bar to rolls composed of two semi-cylindrical members, the guide as a whole having a bore approximating in size and shape the cross section of the grooved bar.

5. The combination of a supporting frame, a block or plate carried by said frame and having a concave seat, a cylindrical guide resting on said seat, a plate resting on the guide and having a concave seat, and two screws carried by said frame and bearing against the plate.

6. The combination of the roll, housings for same, the housing having recessed faces, a frame the ends of which rest in said recesses, screws carried by the housings and engaging the ends of the frame for locking the latter in place, and a guide adjustably secured within the said frame.

7. The combination with rolls, housings for the latter, the housings having recessed faces, a guide box mounted to slide in said recesses, screws for locking the box in position, a cylindrical guide for the bar to be rolled, two clamping plates within the box and supporting the guide, and screws carried by the box and engaging one of said plates for locking the guide in position.

In testimony whereof, we have signed this specification.

GEORGE BROOKS.
ETHAN I. DODDS.
ANDREW KITZINGER.

Copies of this patent may be obtained for five cents each, by addressing the "Commissioner of Patents, Washington, D. C."